Figure 1:
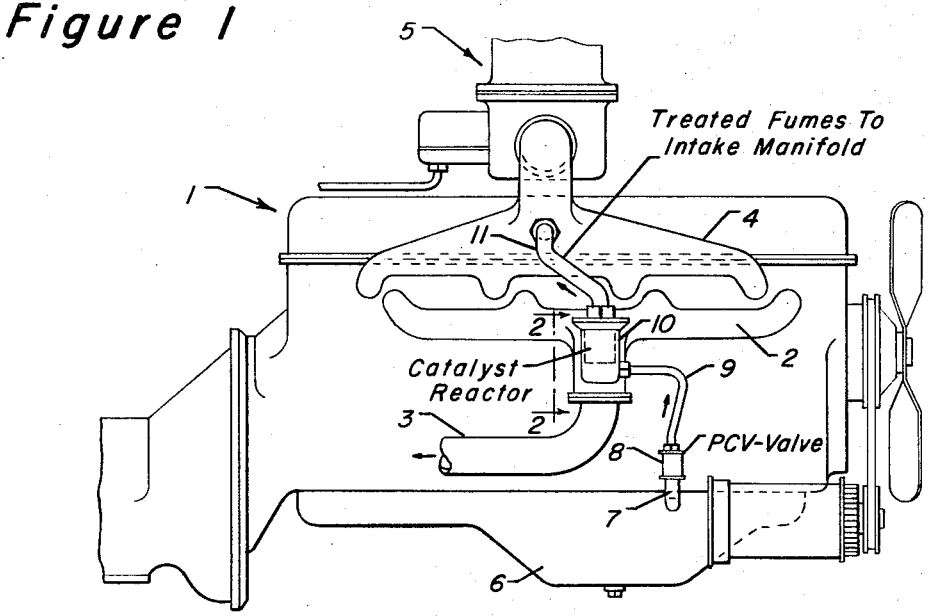

United States Patent [19]
DePalma

[11] 3,846,980
[45] Nov. 12, 1974

[54] CATALYTIC TREATMENT OF RECYCLE GASES FOR AN INTERNAL COMBUSTION ENGINE

[75] Inventor: Ted V. DePalma, Schaumburg, Ill.

[73] Assignee: Universal Oil Products Company, Des Plaines, Ill.

[22] Filed: Mar. 23, 1973

[21] Appl. No.: 344,307

[52] U.S. Cl.................. 60/279, 60/283, 123/119 B
[51] Int. Cl.......................................... F02m 25/06
[58] Field of Search....... 123/119 B, 119 A; 60/278, 60/279, 283

[56] References Cited
UNITED STATES PATENTS

| | | | |
|---|---|---|---|
| 3,071,449 | 1/1963 | Shustack | 60/283 |
| 3,266,474 | 8/1966 | Crandall | 123/119 B |
| 3,294,073 | 12/1966 | Bressan | 123/119 A |
| 3,393,668 | 7/1968 | Millgram | 60/279 |
| 3,476,524 | 11/1969 | Burke | 60/278 |
| 3,641,989 | 2/1972 | Hill | 123/119 A |

Primary Examiner—Wendell E. Burns
Attorney, Agent, or Firm—James R. Hoatson, Jr.; Philip T. Liggett; William H. Page, II

[57] ABSTRACT

A small catalyst reactor section is mounted in association with the exhaust gas outlet means in order to obtain heat transfer and rapid warm-up for oxidation catalyst maintained in the reactor that will, in turn, provide conversion for a hydrocarbon containing crankcase vent stream being returned from the crankcase vent means to the engine intake manifold system. In addition, means may be provided for passing a regulated portion of exhaust gases into and through the same reactor in order to supply resulting $CO_2$ and water vapor as generally inert material to the engine intake and to the combustion zones for reducing flame front temperatures and effecting reductions in $NO_x$ emissions.

9 Claims, 3 Drawing Figures

PATENTED NOV 12 1974

3,846,980

CATALYTIC TREATMENT OF RECYCLE GASES FOR AN INTERNAL COMBUSTION ENGINE

The present invention relates to effecting catalytic conversion of engine crankcase gases which can contain higher boiling hydrocarbon fractions, lubricant mist, or other carbonaceous materials.

More specifically, the present improved system provides that the exhaust gas stream effects heat exchange heating to the catalyst reactor which will accommodate the crankcase vent and/or recycle exhaust gas streams that are being introduced into the engine intake system.

For some period of time, it has been customary to have the vented gases from an engine crankcase pass through a filter and valving means, known as PCV (positive crankcase ventilation) valve, to be introduced into the engine fuel intake system and thence into the engine itself. The PCV system is generally effective in precluding the undesirable venting of hydrocarbon containing gases to the atmosphere; however, the negative pressure in the system does bring in certain higher boiling fractions of the fuel, lubricant mist, and other carbonaceous materials which, in turn, can lead to deposits in the fuel induction system, combustion chamber, spark plugs, and valves.

It is also to be noted that the internal combustion engines for new vehicles (starting with 1973 models) are to be equipped with exhaust gas recirculation, known as "EGR". This recirculation of exhaust gases is desired to add inert material along with the fuel-air mixture into the combustion chambers so that flame front temperatures are reduced to, in turn, reduce nitrogen oxides ($NO_x$) formation. The recycled exhaust gases comprise unburned hydrocarbons and carbon monoxide, along with dirty carbonaceous components, such that it can be highly desirable to effect catalytic treatment of these recycled gases to preclude still further deposition of material in the induction system of the engine.

Thus, it may be considered a principal object of the present invention to provide a system and operation which passes crankcase gaseous components and/or exhaust gas recycle into contact with an oxidation catalyst prior to such gaseous materials being introduced into the fuel-air intake system for the engine.

It is a further object of the present invention to provide a relatively small catalyst containing reactor section for accommodating the one or more recycle streams and to have such reactor mounted in a heat exchange relationship with the exhaust gas outlet system of the engine so that there is rapid heating of the catalyst being used to oxidize the recycled materials.

A still further object of the invention is to incorporate a type of catalyst reactor which will permit cleaning or replacing the catalyst section thereof in order to remove deposited materials on the catalyst or to provide a fresh catalyst bed in the system.

In a broad aspect, the present invention provides in connection with the operation of an internal combustion engine so as to reduce noxious gaseous components therefrom, the improved operation which comprises, positioning a gas pervious oxidation catalyst in a confined zone in heat exchange relationship with an exhaust gas outlet means from the engine and effecting indirect exhaust gas heating to said catalyst, collecting at least a portion of a hydrocarbon containing gaseous vent stream from the crankcase ventilation system of said engine and effecting the passage of such stream through said catalyst into the intake manifold system for the engine to thereby provide for resulting $CO_2$ and water vapor from the catalyst zone to admix with the air-fuel mixture being introduced to the engine.

In another embodiment, the present invention provides a catalytic conversion system for converting a recycled vented stream and/or recycle gas stream in the operation of an internal combustion engine, which comprises in combination, (a) a confined reactor section having a gas pervious catalyst therein which is connective to the exhaust gas outlet means from said engine, whereby to obtain heat from said exhaust means, (b) gas passageway means connecting said reactor section with crankcase-vent means for said engine to thereby provide for a hydrocarbon containing vent stream therefrom to be passed through said catalyst of said reactor section, and (c) additional gas passageway means between said reactor section and the intake manifold means for said engine, whereby a resulting catalytically treated vent gas stream is provided for introduction to the engine along with the fuel mixture thereto.

As noted hereinbefore, the present system may be utilized to advantage for catalytically converting the vent gases from an engine crankcase alone, or additionally, there may be the inclusion of a portion of recycled exhaust gas stream whereby additional inert material is provided to the combustion chambers of the engine to, in turn, control flame front in the combustion zones and engine temperature.

It is not intended to limit the present invention to any one type of catalyst although it is a particular feature to maintain the catalyst reactor section on or adjacent to the exhaust gas manifold or outlet pipe system so as to obtain rapid high temperature heating to the catalyst section through an indirect heat exchange manner. The catalyst may, for example, comprise catalytically coated wire or ribbon, where such metal substrate is of a high temperature resistant nature such as the stainless steels, Chromel and Nichrome, which are alloys of nickel, chromium and iron, or the alloys may be Nikrothal and Kanthal. The Nikrothal being another chromium, nickel and iron alloy while the Kanthal material may be an alloy of chromium, alumina and iron. Typically, these temperature resistant substrates will be coated with a precious metal such as palladium and/or platinum in a manner to provide a spongy, porous type of active coating capable of rapid conversion of oxidizable vaporous and gaseous streams. These all metal types of catalyst have heretofore been disclosed in the H. R. Suter et al U.S. Pat. Nos. 2,658,742 and 2,720,494. Alternatively, the oxidation catalyst maintained within the reaction section may be of a small spherical or pellet-form of the order of 1/16 inch to about ¼ inch and the support will be a suitable refactory inorganic oxide such as alumina, silica, silica-alumina, alumina-magnesia, etc., although other inorganic oxides may comprise silica-thoria, silica-boria, silica-alumina-zirconia, and the like. Catalytic coatings may include metals of Group IIA, IB, VB, VIB, VIIB and VIII and particularly copper, silica, vanadium, chromium, iron, cobalt, nickel, platinum, palladium, etc., with the components being used singly or in combination with one or more of the active components.

It is also possible to utilize a catalytically coated skeletal structure of a ceramic material of the type heretofore recognized as the various "honeycomb" materials. There are various compositions of the skeletal structure support materials and such structures may comprise alpha-alumina, alumina-silica-magnesia, zirconia-silicate, zircon-mullite, and the like. Actually, other refactory crystalline ceramic materials which may be of the honeycomb form and which are utilizable may comprise sillimanite, zircon, petalite, spodumene, cordierite, and alumina-silicates. There are various kinds of skeletal ceramic materials on the market, with the major U.S. manufacturers comprising the American Lava Corporation, a subsidiary of 3M Corporation; E.I. DuPont, Inc.,; and the Corning Glass Company. Additionally, reference may be made to a Johnson U.S. Pat. No. 3,344,925, as well as to Sowards U.S. Pat. No. 3,505,030. The latter patent provides a summary description of various shapes and various methods of manufacturing the skeletal elements, as well as set forth still other U.S. and foreign patents which disclose methods of preparing honeycomb type ceramic elements. The coatings on the honeycomb type materials may, of course, be similar to the active types of coatings utilized in connection with spherical or pelletized types of support materials.

It may also be of particular advantage in connection with the present improved type of conversion system to utilize a removable catalyst element within the reactor section such that there may be periodical cleaning, reactivation or replacement of such element. Thus, the all metal catalyst or the ceramic type of catalyst material in either the honeycomb or pill form, may be encased within temperature resistant alloy screening or other perforate means such that the element as a whole may be lifted out of the reactor section and replaced. A suitable cover or other removable plate means can be embodied in the reactor design in order to permit access to the interior thereof and permit the desired change of catalyst.

Reference to the accompanying drawing and the following descriptions thereof will serve to illustrate and help describe the crankcase fume treating system through a heated reactor section for an internal combustion engine, as well as point out variations that may be made within the system.

FIG. 1 of the drawing is a diagrammatic elevational view indicating the passage of crankcase fumes through a PCV value to a reactor section and thence to the engine intake manifold.

Figure 2:
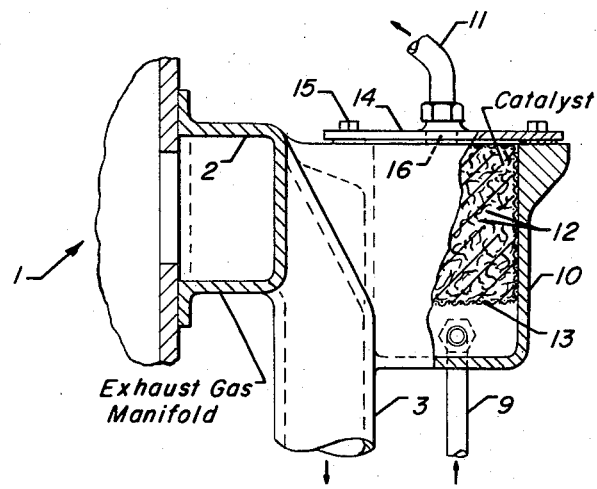

FIG. 2 of the drawing is a slightly enlarged side elevational view, partially in section, as indicated by the line 2—2 in FIG. 1, illustrating the reactor section mounted on a side portion of the exhaust gas manifold.

Figure 3:
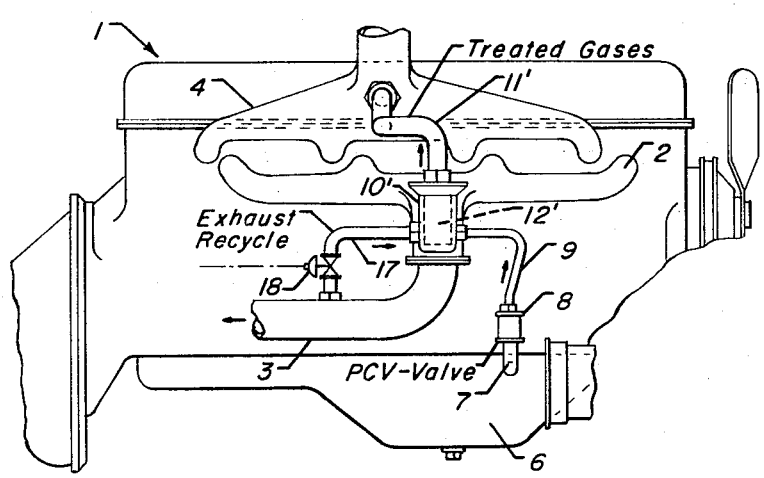

FIG. 3 of the drawing is a diagrammatic elevational view indicating a modified system where a portion of the exhaust gas stream is recycled through the catalyst reactor section to the intake manifold in order to be catalytically treated along with the crankcase fume stream.

Referring now particularly to FIGS. 1 and 2 of the drawing, there is indicated an internal combustion engine 1 with an exhaust gas outlet manifold 2 having outlet pipe 3 and an intake manifold 4 connecting with superposed carburetor means 5. Additionally, there is shown a crankcase 6 with a vent means 7 carrying through the PCV valve 8 to line 9 which in turn connects with a lower portion of a catalyst reactor 10 whereby treated fumes may then be passed by way of line 11 to the intake manifold 4.

As best shown by FIG. 2 of the drawing, the reactor section 10 is mounted on the side of exhaust gas manifold 2 by being integrally cast with the manifold, or being welded thereto, such that there is heat conduction to the entire reactor section 10 and to the catalyst 12 which is indicated as being contained within the interior of such reactor section. It may also be noted that the catalyst 12 in the present embodiment is indicated as being of a compacted metal ribbon or wire in turn contained within a holding screen 13 such that the entrie catalyst section may be readily removed from the housing. A suitable removable cover plate 14, held down by cap screw 15, is shown at the upper portion of reactor section 10 to permit the easy removal of the catalyst element 12. Additionally, there is indicated the fume inlet line 9 connecting with the lower portion of the reactor 10 below catalyst element 12 while treated fumes can leave by way of line 11 from the upper portion of the reactor section, through an outlet opening 16 provided in the cover plate 14.

The engine intake manifold 4 serves to provide suction on lines 11 and 9 such that the crankcase fumes through the PCV valve 8 are pulled into the intake manifold in the manner which has been conventional with automobile engines for some period of time; however, in the present instance the fumes are additionally passed through the catalyst 12 in reactor section 10 which, in turn, is mounted on a portion of the exhaust gas system such that there is a catalytic purification of the vent gases prior to their being pulled into the intake manifold and the remaining portions of the engine fuel induction system.

Referring now to FIG. 3 of the drawing, there is indicated an internal combustion type engine similar to that of FIG. 1 except that in the present instance there is a recycle line 17 with control valve means 18 connective between exhaust gas outlet line 3 and the reactor section 10 containing catalyst 12 such that the recycle exhaust gases may also be catalytically treated to produce primarily $CO_2$ and water vapor which will pass along with the similar product materials from the vent gas stream by way of the outlet line 11' which connects to the intake manifold 4. In this embodiment, the line 11' will necessarily be somewhat larger than that indicated within FIGS. 1 and 2 in order to accommodate additional gases from the exhaust gas recycle stream. It may also be advisable to provide a somewhat larger catalyst element, or catalyst section 12'; whereby the combined gaseous streams are to be accommodated by the heated reactor section 10' so as to effect the purification of the streams being recycled into the engine induction system. The valve 18 within recycle line 17 is indicated as being of an automatic control type and such valve may be either pneumatically or electrically controlled responsive to temperature means, or other sensing means (which are not shown in the present system) but may be combined with the combustion zones of the engine such that the quantity of recycled exhaust gas which will be used as an inert additive material to the combustion chambers to control flame front temperature and in turn reduce $NO_x$ emissions responsive to sensing means in, or directly adjacent to, the combustion zones of the engine.

The drawings and the foregoing descriptions have indicated that the reactor section 10 shall be primarily heated by indirect heat exchange relationship with the exhaust gas manifold or outlet pipe means, thus primarily by heat conduction; however, it may be deemed desirable in a modified arrangement to bleed a small amount of exhaust gas stream from the manifold directly through the wall of the reactor section into the catalyst element 12 such that there is direct heating thereof from a small quantity of high temperature exhaust gas. Actually, there could be adjustable port means or passageway means to effect a regulation of the quantity of the bleed gas stream into the reactor section. In any event, it is to be noted that the present drawings are merely diagrammatic and various modifications may be made in design and construction, or with respect to placement of the particular parts of the system within the scope of the present invention.

I claim as my inventions:

1. In the operation of an internal combustion engine to reduce noxious gaseous components therefrom, the improved operation which comprises, positioning a gas previous oxidation catalyst in a confined zone in heat exchange relationship with an exhaust gas outlet means from said engine and effecting indirect exhaust gas heating to said catalyst, collecting at least a portion of a hydrocarbon containing gaseous stream from the crankcase ventilation system of said engine and effecting the passage of such stream through said catalyst into the intake manifold system for said engine to thereby provide for resulting $CO_2$ and water vapor from the catalyst zone to admix with the air-fuel mixture being introduced to the engine, and collecting at least a portion of the exhaust gas stream from said engine and recycling said exhaust gas stream through said catalyst to combine with said gaseous stream from said crankcase ventilation system prior to feeding thereof to said intake manifold system.

2. The operation of claim 1 further characterized in that a portion of recycle exhaust gas from the engine exhaust gas stream is passed through said catalyst and resulting conversion products therefrom are admixed with the conversion products from said crankcase gaseous stream.

3. The operation of claim 1 further characterized in that said oxidation catalyst is of an all metal nature comprising an active oxidizing component on temperature resistant alloy in wire or ribbon form.

4. The operation of claim 1 further characterized in that said oxidation catalyst is a subdivided inorganic oxide substrate which is catalytically coated with a suitable oxidizing component.

5. A catalytic conversion system for converting a recycled gas stream in the operation of an internal combustion engine, which comprises in combination:
   a. a confined reactor section connective to the exhaust gas outlet means from said engine to obtain heat therefrom and having a gas pervious body of catalyst therein which in turn can receive engine heat from the engine operation;
   b. gas passageway means connecting said reactor section with crankcase-vent means for said engine to thereby provide for a hydrocarbon containing vent stream therefrom to be passed through said catalyst of said reactor section;
   c. additional gas passageway means between said reactor section and the intake manifold means for said engine, whereby a resulting catalytically treated vent gas stream is provided for introduction to said engine along with the fuel mixture thereto; and
   d. second additional passageway means between the exhaust gas outlet means and said reactor section to thereby recycle a portion of the said exhaust gas stream through said reactor section to combine with treated crankcase gases prior to feed-in thereof to said intake manifold means.

6. The catalytic conversion system of claim 5 further characterized in that said catalyst in said reactor section is an all metal catalyst comprising an active oxidizing component deposited in a porous spongy form on a heat resistant alloy base of wire or ribbon.

7. The catalytic conversion system of claim 5 further characterized in that said reactor section is an inorganic refractory oxide material in subdivided form with an active oxidation coating.

8. The catalytic conversion system of claim 5 further characterized in that said reactor section has a removable wall portion whereby the catalyst in such section may be removed and replaced.

9. The catalytic system of claim 5 still further characterized in that said passageway means for the recycle exhaust gas stream is provided with valve control means whereby to regulate the quantity of exhaust gas being recycled through said reactor section to said engine intake system.

* * * * *